(12) United States Patent
Reigl et al.

(10) Patent No.: US 8,622,083 B2
(45) Date of Patent: Jan. 7, 2014

(54) HIGH TEMPERATURE STEAM VALVE

(75) Inventors: Martin Reigl, Ehrendingen (CH); Helen Elisabeth Parker, West Haddon (GB)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 13/469,162

(22) Filed: May 11, 2012

(65) Prior Publication Data

US 2012/0286188 A1 Nov. 15, 2012

(30) Foreign Application Priority Data

May 12, 2011 (IT) ............................. M12011A0830

(51) Int. Cl.
*F16K 27/00* (2006.01)
(52) U.S. Cl.
USPC ............ 137/549; 251/318; 251/366; 251/368
(58) Field of Classification Search
USPC ................... 251/318, 366, 368; 137/544–550
See application file for complete search history.

(56) References Cited

U.S. PATENT DOCUMENTS

| 6,070,605 A * | 6/2000 | Steenburgh ...................... 137/1 |
| 6,491,769 B1 | 12/2002 | Smith et al. |
| 6,655,409 B1 * | 12/2003 | Steenburgh et al. ..... 137/614.19 |
| 7,604,021 B2 * | 10/2009 | Ootomo et al. ............... 137/545 |
| 2005/0063818 A1 * | 3/2005 | Suter ............................ 415/183 |
| 2008/0163944 A1 * | 7/2008 | Seaton ....................... 137/637.2 |
| 2010/0032607 A1 * | 2/2010 | Takei et al. ................... 251/368 |

FOREIGN PATENT DOCUMENTS

| EP | 2206795 A2 | 7/2010 |
| GB | 1007437 A | 10/1965 |
| WO | 2007/025945 A1 | 3/2007 |

* cited by examiner

*Primary Examiner* — John Bastianelli
(74) *Attorney, Agent, or Firm* — Volpe and Koenig, P.C.

(57) ABSTRACT

A steam valve is provided including a chest, a lock, a spindle, and a strainer. Each of these components is made of specific Ni alloys combinations that enable the valve to operate at temperatures above 650° C. with a good service life.

2 Claims, 1 Drawing Sheet

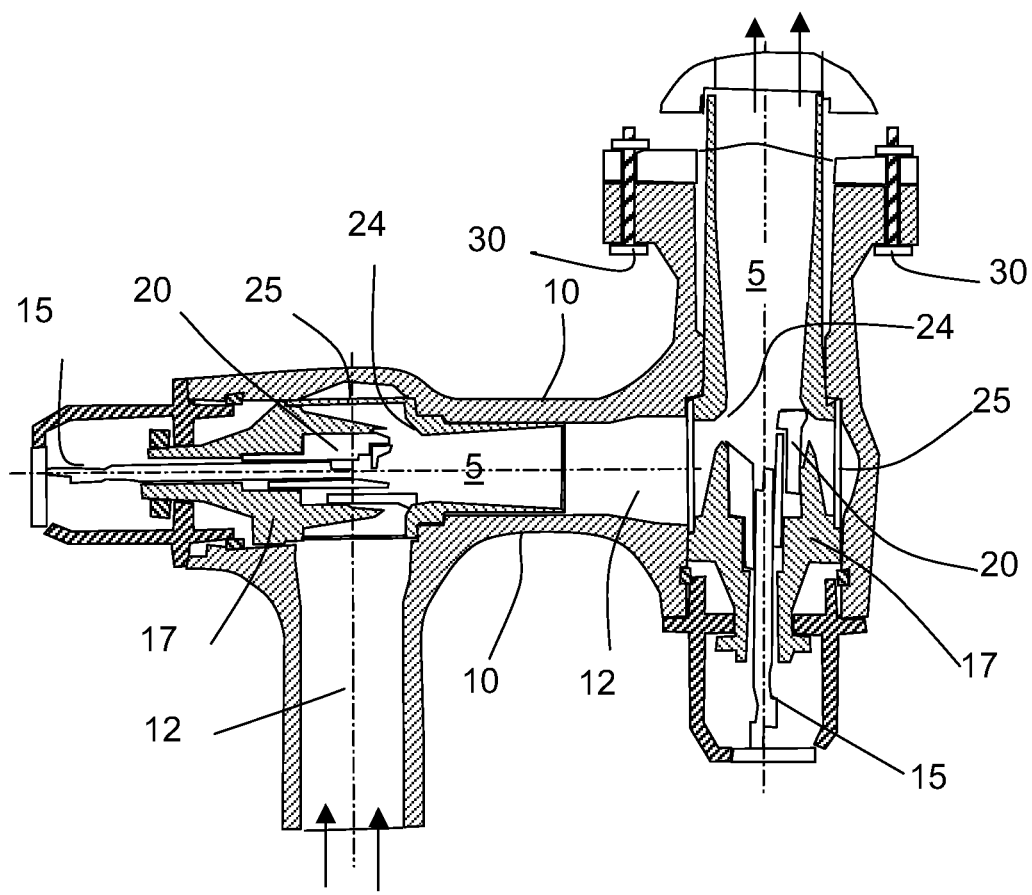

HIGH TEMPERATURE STEAM VALVE

RELATED APPLICATION

The present application hereby claims priority under 35 U.S.C. Section 119 to Italian Patent application number MI2011A000830, filed May 12, 2011, the entire contents of which are hereby incorporated by reference.

FIELD OF THE INVENTION

The present disclosure relates to high temperature-resistant steam valves, and more particularly to steam valves for steam turbines. For the purposes of this specification the term "high-temperature" shall be taken to mean at least 650 degrees Celsius.

BACKGROUND

An effective means to increase power generation efficiency of a steam turbine is to raise the turbine steam temperature to 650 deg. C. or more.

Special considerations may be made for these high temperatures. For example, the valve may require cooling features or additionally may be made of high hot strength materials. While cooling means typically have only limited effectiveness, the use of different materials in a valve can introduce problems as different materials have different coefficients of expansion and thus upon heating, unacceptable internal stresses may be created which may adversely affect service life.

SUMMARY

The present disclosure relates to a steam valve including a chest, a lock, a spindle, and a strainer. Each of these components is made of specific Ni alloys combinations that enable the valve to operate at temperatures above 650° C. with a good service life.

BRIEF DESCRIPTION OF THE DRAWING

By way of example, an embodiment of the present disclosure is described more fully hereinafter with reference to the accompanying drawing, in which:

FIG. 1 is a cut view of a pair of steam valves to which embodiments may be applied

DETAILED DESCRIPTION OF THE PREFERRED EMBODIMENTS

Introduction to the Embodiments

A high temperature steam valve is disclosed that addresses the problem of service life, particularly the problem of cracking and oxidation due to high temperature operation.

The disclosure attempts to address this problem by means of the subject matters of the independent claim. Advantageous embodiments are given in the dependent claim.

The disclosure is based on the general idea using specific materials combinations for component pieces of a steam turbine valve.

DETAILED DESCRIPTION

An exemplary embodiment of the present disclosure is now described with reference to the drawing, wherein like reference numerals are used to refer to like elements throughout. In the following description, for purposes of explanation, numerous specific details are set forth to provide a thorough understanding of the disclosure. However, the present disclosure may be practiced without these specific details, and as such is not limited to the exemplary embodiments disclosed herein.

FIG. 1 shows a series of two high temperature steam turbine valves 5. Exemplary embodiments maybe applied to any one or both of the valves 5. The valves 5 each comprise a chest 10, which is a casing that forms a chamber. In the chamber is a lock 17 with a cavity through which a spindle 15 extends. The spindle 15 has two distal ends. One end protrudes out from the chest 10 while the other end is located in the chamber. The purpose of the lock 17 is to guide the movement of the spindle 15 whose purpose is to movably position a valve closing member 20, for example a disk, plug or equivalent, relative to a seat 24, so as to bring the valve 5 either into an open or closed state. A strainer 25 is located in the chamber upstream of the closing means and preferably at least partially in the inlet port 12. These locations enable the strainer 25 to perform its function of retaining solid particles typically present in the steam, thus reducing potential damage to the valves closing means.

At a downstream end of the valve 5, a plurality of bolts 30 are optionally provided. The purpose of the bolts 30 is to provide a means to fix the valve 5 relative to further steam turbine equipment items. These items may include, but are not limited to further piping, turbine casings, and further valves.

In an exemplary embodiment, the chest 10 shown in FIG. 1 is made of a heat resisting material consisting of: a plurality of main alloying elements comprising, in weight percent: C, from 0.01 to 0.03; Cr, from 20.0 to 23.0; Mo, from 8.0 to 10.0; Nb, from 3.20 to 3.80; Ti, from 0.1 to 0.30; Al, from 0.10 to 0.30; Mn, from 0.10 to 0.50; and Si, from 0.05 to 0.30; a plurality of residual elements comprising, in weight percent, up to: 4.0 Fe; 1.0 Co; 0.015 P; and 0.015 S; and a balance of Ni.

In an exemplary embodiment, the chest 10 shown in FIG. 1 is made of a heat resisting material consisting of: a plurality of main alloying elements comprising, in weight percent. C, from 0.04 to 0.08; Cr, from 18.5 to 20.5; Mo, from 8.0 to 9.0; Co, from 9.0 to 11.0; Ti, from 1.9 to 2.3; and B, 0.003 to 0.005; a plurality of residual elements comprising, in weight percent: up to, 0.3 Mn; 1.5 Fe, and 0.15 Si; and a balance of Ni.

In an exemplary embodiment, the chest 10 shown in FIG. 1 is made of a heat resisting material consisting of: a plurality of main alloying elements comprising, in weight percent, C from 0.02 to 0.06, Cr from 23.0 to 26.0, Co from 19.0 to 21.0, Ti from 1.1 to 1.9, Al from 0.9 to 1.5, and Nb from 1.0 to 1.6; a plurality of residual elements comprising, in weight percent, up to 1.5 Fe, 0.6 Mo, 0.5 Si, 0.4 Mn; and a balance of Ni.

In an exemplary embodiment, the chest 10 shown in FIG. 1 is made of a heat resisting material consisting of: a plurality of main alloying elements comprising, in weight percent, C from 0.01 to 0.03, Cr from 20.0 to 23.0, Mo from 8.0 to 10.0, and Nb from 3.15 to 4.15; a plurality of residual elements comprising, in weight percent, up to, 5.0 Fe, Ti 0.40 Ti, 0.40 Al, 0.1 Mn, 0.10 Si, 0.010 P, 0.005 S, 0.1 Cu, and 0.1 Co; and a balance of Ni.

In an exemplary embodiment, the chest 10 shown in FIG. 1 is made of a heat resisting material consisting of: a plurality of main alloying elements comprising, in weight percent, C from 0.05 to 0.1, Cr from 20.0 to 23.0, Mo from 8.5 to 10.0. Co from 11.0 to 14.0. Ti from 0.2 to 0.6, and Al from 0.7 to 1.4; a plurality of residual elements comprising, in weight percent, up to, 2.0 Fe, 0.2 Mn, 0.2 Si, 0.010 P, 0.010 S, 0.5 Cu, and 0.006 B; and a balance of Ni.

In an exemplary embodiment, the chest 10 shown in FIG. 1 is made of a heat resisting material consisting of: a plurality of main alloying elements comprising, in weight percent, C from 0.05 to 0.1, Cr from 21.5 to 23.0, Mo from 8.5 to 10.0, Co from 11.5 to 13.0 Ti from 0.4 to 0.6, Al from 1.0 to 1.30, and B from 0.003 to 0.006; a plurality of residual elements comprising, in weight percent, up to, 2.0 Fe, 0.1 Mn, 0.1 Si, 0.010 P, 0.050 S, 0.5 Cu; and a balance of Ni.

In an exemplary embodiment, the spindle 15 shown in FIG. 1 is made of a heat resisting, material consisting of: a plurality of main alloying elements comprising, in weight percent, C from 0.03 to 0.07, Cr from 23.8 to 24.8, Mo from 1.2 to 1.7 Co from 19.0 to 20.5, Ti from 2.8 to 3.2, Al from 1.2 to 1.6, Nb from 0.7 to 1.2, Zr from 0.03 to 0.07, B from 0.01 to 0.015; a plurality of residual elements comprising, in weight percent, up to, 1.0 Fe, 0.5 Mn, 0.5 Si, 0.0050 P, 0.0050 S, 0.2 Cu, 0.006 Mg, 0.05 Ta; and a balance of Ni.

In an exemplary embodiment, the spindle 15 shown in FIG. 1 is made of a heat resisting material consisting of: a plurality of main alloying elements comprising, in weight percent, C from 0.04 to 0.08, Cr from 18.5 to 20.5, Mo from 8.0 to 9.0, Co from 9.0 to 11.0, Ti from 1.9 to 2.3, and B 0.003 to 0.005; a plurality of residual elements comprising, in weight percent, up to, 0.3 Mn, 1.5 Fe, and 0.15 Si; and a balance of Ni.

In an exemplary, embodiment, the spindle 15 shown in FIG. 1 is made of a heat resisting material consisting of: a plurality of main alloying elements comprising, in weight percent, C from 0.02 to 0.06, Cr from 23.0 to 26.0, Co from 19.0 to 21.0, Ti from 1.1 to 1.9, Al from 0.9 to 1.5, and Nb from 1.0 to 1.6; a plurality of residual elements comprising, in weight percent, up to, 1.5 Fe, 0.6 Mo, 0.5 Si, 0.4 Mn; and a balance of Ni.

In an exemplary embodiment, the spindle 15 shown in FIG. 1 is made of a heat resisting material consisting of: a plurality of main alloying elements comprising, in weight percent, Cr from 14.0 to 15.7, Mo from 4.5 to 5.5, Co from 18.0 to 22.0, Al from 4.5 to 4.9, Ti from 0.9 to 1.5, and B from 0.003 to 0.010; a plurality of residual elements comprising, in weight percent, up to 0.12 C, 1.0 Fe, 1.0 Mn, 1.0 Si, 0.0050 S, 0.2 Cu, and 0.15 Zr; and a balance of Ni.

In an exemplary embodiment, the spindle 15 shown in FIG. 1 is made of a heat resisting material consisting of: a plurality of main alloying elements comprising, in weight percent C from 0.04 to 0.08, Cr from 19.0 to 21.0, Mo from 5.6 to 6.1 Co from 19.0 to 21.0 Ti from 1.9 to 2.4, and a combination of Ti and Al from 2.4 to 2.8; a plurality of residual elements comprising, in weight percent, up to, 0.7 Fe, 0.6 Mn, 0.40 Si, 0.60 Al, 0.007 S, 0.0020 Pb, 0.20 Cu, 0.0001 Bi, 0.005 B and a balance of Ni, In an exemplary embodiment, the lock 17 shown in FIG. 1 is made of a heat resisting material consisting of: a plurality of main alloying elements comprising, in weight percent, C from 0.01 to 0.03, Cr from 20.0 to 23.0, Mo from 8.0 to 10.0, Nb from 3.20 to 3.80, Ti from 0.1 to 0.30, Al from 0.10 to 0.30, Mn from 0.10 to 0.50, and Si from 0.05 to 0.30; a plurality of residual elements comprising, in weight percent, up to, 4.0 Fe, 1.0 Co, 0.015 P, and 0.015 S; and a balance of Ni.

In an exemplary embodiment, the lock 17 shown in FIG. 1 is made of a heat resisting material consisting of: a plurality of main alloying elements comprising, in weight percent, C from 0.04 to 0.08, Cr from 18.5 to 20.5, Mo from 8.0 to 9.0, Co from 9.0 to 11.0, Ti from 1.9 to 2.3, and B 0.003 to 0.005; a plurality of residual elements comprising, in weight percent, up to, 0.3 Mn, 1.5 Fe, and 0.15 Si; and a balance of Ni.

In an exemplary embodiment, the lock 17 shown in FIG. 1 is made of a heat resisting material consisting of: a plurality of main alloying elements comprising, in weight percent, C from 0.02 to 0.06, Cr from 23.0 to 26.0, Co from 19.0 to 21.0, Ti from 1.1 to 1.9, Al from 0.9 to 1.5, and Nb from 1.0 to 1.6; a plurality of residual elements comprising, in weight percent, up to, 1.5 Fe, 0.6 Mo, 0.5 Si, 0.4 Mn; and a balance of Ni.

In an exemplary embodiment, the lock 17 shown in of FIG. 1 is made of a heat resisting, material consisting of: a plurality of main alloying elements comprising, in weight percent, C from 0.01 to 0.03, Cr from 20.0 to 23.0 Mo from 8.0 to 10.0, and Nb from 3.15 to 4.15; a plurality of residual elements comprising, in weight percent, up to, 5.0 Fe, Ti 0.40 Ti, 0.40 Al, 0.1 Mn, 0.10 Si, 0.010 P, 0.005 S, 0.1 Cu, and 0.1 Co; and a balance of Ni.

In an exemplary embodiment, the lock 17 shown in FIG. 1 is made of a heat resisting material consisting of: a plurality of main alloying elements comprising, in weight percent, C from 0.05 to 0.1, Cr from 20.0 to 23.0, Mo from 8.5 to 10.0, Co from 11.0 to 14.0, Ti from 0.2 to 0.6, and Al from 0.7 to 1.4; a plurality of residual elements comprising, in weight percent, up to, 2.0 Fe, 0.2 Mn, 0.2 Si, 0.010 P, 0.010 S, 0.5 Cu, and 0.006 B; and a balance of Ni.

In an exemplary embodiment, the lock 17 shown in FIG. 1 is made of a heat resisting material consisting of: a plurality of main alloying elements comprising, in weight percent, C from 0.05 to 0.1, Cr from 21.5 to 23.0, Mo from 8.5 to 10.0, Co from 11.5 to 13.0, Ti from 0.4 to 0.6, Al from 1.0 to 1.30, and B from 0.003 to 0.006; a plurality of residual elements comprising, in weight percent, up to, 2.0 Fe, 0.1 Mn, 0.1 Si, 0.010 P, 0.050 S, 0.5 Cu; and a balance of Ni.

In an exemplary embodiment, the lock 17 shown in FIG. 1 is made of a heat resisting material consisting of: a plurality of main alloying elements comprising, in weight percent, C from 0.04 to 0.08, Cr from 19.0 to 21.0, Mo from 5.6 to 6.1, Co from 19.0 to 21.0, Ti from 1.9 to 2.4, and a combination of Ti and Al from 2.4 to 2.8; a plurality of residual elements comprising, in weight percent, up to, 0.7 Fe, 0.6 Mn, 0.40 Si, 0.60 Al, 0.007 S, 0.0020 Pb, 0.20 Cu, 0.0001 Bi, 0.005 B and a balance of Ni.

In an exemplary embodiment, the strainer 25 of FIG. 1 is made of a heat resisting material consisting of a plurality of main alloying elements comprising, in weight percent, C from 0.01 to 0.03, Cr from 20.0 to 23.0 Mo from 8.0 to 10.0 Nb from 3.20 to 3.80, Ti from 0.1 to 0.30, Al from 0.10 to 0.30, Mn from 0.10 to 0.50, and Si from 0.05 to 0.30; a plurality of residual elements comprising, in weight percent, up to, 4.0 Fe, 10.0 Co, 0.015 P, and 0.015 S; and a balance of Ni.

In an exemplary embodiment, the strainer 25 shown in FIG. 1 is made of a heat resisting material consisting of: a plurality of main alloying elements comprising, in weight percent, C from 0.04 to 0.08, Cr from 18.5 to 20.5, Mo from 8.0 to 9.0, Co from 9.0 to 11.0, Ti from 1.9 to 2.3, and B 0.003 to 0.005; a plurality of residual elements comprising, in weight percent, up to, 0.3 Mn, 1.5 Fe, and 0.15 Si; and a balance of Ni.

In an exemplary embodiment, the strainer 25 shown in FIG. 1 is made of a heat resisting material consisting of: a plurality of main alloying elements comprising, in weight percent, C from 0.02 to 0.06, Cr from 23.0 to 26.0, Co from 19.0 to 21.0, Ti from 1.1 to 1.9, Al from 0.9 to 1.5, and Nb from 1.0 to 1.6; a plurality of residual elements comprising, in weight percent, up to 1.5 Fe, 0.6 Mo, 0.5 Si, 0.4 Mn; and a balance of Ni.

In an exemplary embodiment, the strainer 25 of FIG. 1 is made of a heat resisting material consisting of: a plurality of main alloying elements comprising, in weight percent, C from 0.01 to 0.03, Cr from 20.0 to 23.0, Mo from 8.0 to 10.0, and Nb from 3.15 to 4.15; a plurality of residual elements comprising, in weight percent, up to 5.0 Fe, 0.40 Ti, 0.40 Al, 0.1 Mn, 0.10 Si, 0.010 P 0005 S, 0.1 Cu, and 0.1 Co; and a balance of Ni.

In an exemplary embodiment, the strainer 25 of FIG. 1 is made of a heat resisting material consisting of: a plurality of main alloying elements comprising, in weight percent, C from 0.05 to 0.1, Cr from 200 to 23.0, Mo from 8.5 to 10.0, Co from 11.0 to 14.0, Ti from 0.2 to 0.6, and Al from 0.7 to 1.4; a plurality of residual elements comprising, in weight percent, up to, 2.0 Fe, 0.2 Mn, 0.2 Si, 0.010 P, 0.010 S, 0.5 Cu, and 0.006 B; and a balance of Ni.

In an exemplary embodiment, the strainer 25 of FIG. 1 is made of a heat resisting material consisting of: a plurality of main alloying elements comprising, in weight percent 0.05 to 0.1 C, 21.5 to 23.0 Cr, 8.5 to 10.0 Mo, 11.5 to 13.0 Co, 0.4 to 0.6 Ti, 1.0 to 1.30 Al, and 0.003 to 0.006 B; a plurality of residual elements comprising, in weight percent, up to 2.0 Fe, 0.1 Mn, 0.1 Si, 0.010 P, 0.050 S, 0.5 Cu; and a balance of Ni.

In an exemplary embodiment, the bolts 30 of FIG. 1 are made of a heat resisting material consisting of: a plurality of main alloying elements comprising, in weight percent, C from 0.03 to 0.07, Cr from 23.8 to 24.8, Mo from 1.2 to 1.7, Co from 19.0 to 20.5, Ti from 2.8 to 3.2, Al from 1.2 to 1.6, Nb from 0.7 to 1.2, Zr from 0.03 to 0.07, B from 0.01 to 0.015; a plurality of residual elements comprising, in weight percent, up to, 1.0 Fe, 0.5 Mn, 0.5 Si, 0.0050 P, 0.0050 S, 0.2 Cu, 0.006 Mg, 0.05 Ta; and a balance of Ni.

In an exemplary embodiment, the bolts 30 shown in FIG. 1 is made of a heat resisting material consisting of: a plurality of main alloying elements comprising, in weight percent, C from 0.04 to 0.08, Cr from 18.5 to 20.5, Mo from 8.0 to 9.0, Co from 9.0 to 11.0, Ti from 1.9 to 2.3, and B 0.003 to 0.005; a plurality of residual elements comprising, in weight percent, up to, 0.3 Mn, 1.5 Fe, and 0.15 Si; and a balance of Ni.

In an exemplary embodiment, the bolts 30 shown in FIG. 1 is made of a heat resisting material consisting of: a plurality of main alloying elements comprising, in weight percent, C from 0.02 to 0.06, Cr from 23.0 to 26.0, Co from 19.0 to 21.0 Ti from 1.1 to 1.9, Al from 0.9 to 1.5, and Nb from 1.0 to 1.6; a plurality of residual elements comprising, in weight percent, up to, 1.5 Fe, 0.6 Mo, 0.5 Si, 0.4 Mn; and a balance of Ni.

In an exemplary embodiment, the bolts 30 of FIG. 1 are made of a heat resisting material consisting of: a plurality of main alloying elements comprising, in weight percent Cr from 14.0 to 15.7, Mo from 4.5 to 5.5, Co from 18.0 to 22.0, Al from 4.5 to 4.9, Ti from 0.9 to 1.5, and B from 0.003 to 0.010; a plurality of residual elements comprising, in weight percent, up to 0.12 C, 1.0 Fe, 1.0 Mn, 1.0 Si, 0.0050 S, 0.2 Cu, and 0.15 Zr; and a balance of Ni.

In an exemplary embodiment, the bolts 30 of FIG. 1 are made of a heat resisting material consisting of: a plurality of main alloying elements comprising, in weight percent Co from 12.0 to 15.0, Cr from 8.0 to 21.0, Mo from 3.50 to 5.00, Al from 1.2 to 1.6, Ti from 2.8 to 3.3, B from 0.0030 to 0.0100, Zr from 0.02 to 0.08, C from 0.02 to 0.1, and Mn from 0.02 to 0.1; a plurality of residual elements comprising, in weight percent, up to 0.15 Si, 0.015 P, 0.015 S, 2.0 Fe, and 0.10 Cu; and a balance of Ni.

Although the disclosure has been herein shown and described in what is conceived to be the most practical exemplary embodiment, it will be that the present disclosure can be embodied in other specific. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

LIST OF REFERENCE NUMERALS

5 Valve
10 Chest
12 Inlet port
15 Spindle
17 Lock
20 Valve closing member
24 Seat
25 Strainer
30 Bolt

What is claimed is:

1. A steam valve (5) comprising:
a chest (10) forming a chamber;
a lock (17), in the chamber, with a cavity
a spindle (15), movably extending through the cavity, the spindle (15) having first and second distal ends, wherein the lock (17) and spindle (15) are configured such that the first distal end is located outside the chamber and the second distal end is located in the chamber;
a valve closing member (20) connected to the second end; and
a strainer (25) in the chamber adapted to retain solid particles, wherein the chest (10) is made of one of the group consisting of:
i) a heat resisting material consisting of:
a plurality of main alloying elements comprising, in weight percent, C from 0.01 to 0.03, Cr from 20.0 to 23.0, Mo from 8.0 to 10.0, Nb from 3.20 to 3.80, Ti from 0.1 to 0.30, Al from 0.10 to 0.30, Mn from 0.10 to 0.50, and Si from 0.05 to 0.30;
a plurality of residual elements comprising, in weight percent, up to, 4.0 Fe, 1.0 Co, 0.015 P, and 0.015 S; and
a balance of Ni;
ii) a heat resisting material consisting of:
a plurality of main alloying elements comprising, in weight percent, C from 0.04 to 0.08, Cr from 18.5 to 20.5, Mo from 8.0 to 9.0, Co from 9.0 to 11.0, Ti from 1.9 to 2.3, and B 0.003 to 0.005;
a plurality of residual elements comprising, in weight percent, up to 0.3 Mn, 1.5 Fe, and 0.15 Si; and
a balance of Ni;
iii) a heat resisting material consisting of:
a plurality of main alloying elements comprising, in weight percent, C from 0.02 to 0.06, Cr from 23.0 to 26.0, Co from 19.0 to 21.0, Ti from 1.1 to 1.9, Al from 0.9 to 1.5, and Nb from 1.0 to 1.6;
a plurality of residual elements comprising, in weight percent, up to, 1.5 Fe, 0.6 Mo, 0.5 Si, 0.4 Mn; and
a balance of Ni,
iv) a heat resisting material consisting of:
a plurality of main alloying elements comprising, in weight percent, C from 0.01 to 0.03, Cr from 20.0 to 23.0, Mo from 8.0 to 10.0, and Nb from 3.15 to 4.15;
a plurality of residual elements comprising, in weight percent, up to, 5.0 Fe, 0.40 Ti, 0.40 Al, 0.1 Mn, 0.10 Si, 0.010 P, 0.005 S, 0.1 Cu, and 0.1 Co; and
a balance of Ni,
v) a heat resisting material consisting of:
a plurality of main alloying elements comprising, in weight percent, C from 0.05 to 0.1, Cr from 20.0 to 23.0, Mo from 8.5 to 10.0, Co from 11.0 to 14.0, Ti from 0.2 to 0.6, and Al from 0.7 to 1.4;
a plurality of residual elements, comprising, in weight percent, up to, 2.0 Fe, 0.2 Mn, 0.2 Si, 0.010 P, 0.010 S, 0.5 Cu, and 0.006 B; and
a balance of Ni, vi) a heat resisting material consisting of:
a plurality of main alloying elements comprising, in weight percent, C from 0.05 to 0.1, Cr from 21.5 to 23.0, Mo from 8.5 to 10.0, Co from 11.5 to 13.0, Ti from 0.4 to 0.6, Al from 1.0 to 1.30, and B from 0.003 to 0.006;
a plurality of residual elements comprising, in weight percent, up to, 2.0 Fe, 0.1 Mn, 0.1 Si, 0.010 P, 0.050 S, 0.5 Cu; and
a balance of Ni; and vii) a heat resisting material consisting of:
a plurality of main alloying elements comprising, in weight percent, C from 0.04 to 0.08, Cr from 19.0 to 21.0, Mo from 5.6 to 6.1, Co from 19.0 to 21.0, Ti from 1.9 to 2.4, and a combination of Ti and Al from 2.4 to 2.8;
a plurality of residual elements comprising, in weight percent, up to, 0.7 Fe, 0.6 Mn, 0.40 Si, 0.60 Al, 0.007 S, 0.0020 Pb, 0.20 Cu, 0.0001 Bi, 0.005 B; and
a balance of Ni;

and wherein the spindle (15) is made of one of the group consisting of:

a) a heat resisting material consisting of:
a plurality of main alloying elements comprising, in weight percent, C from 0.03 to 0.07, Cr from 23.8 to 24.8, Mo from 1.2 to 1.7, Co from 19.0 to 20.5, Ti from 2.8 to 3.2, Al from 1.2 to 1.6, Nb from 0.7 to 1.2, Zr from 0.03 to 0.07, B from 0.01 to 0.015;
a plurality of residual elements comprising, in weight percent, up to, 1.0 Fe, 0.5 Mn, 0.5 Si, 0.0050 P, 0.0050 S, 0.2 Cu, 0.006 Mg, 0.05 Ta; and
a balance of Ni, b) a heat resisting material consisting of:
a plurality of main alloying elements comprising, in weight percent, C from 0.04 to 0.08, Cr from 18.5 to 20.5, Mo from 8.0 to 9.0, Co from 9.0 to 11.0, Ti from 1.9 to 2.3, and B 0.003 to 0.005;
a plurality of residual elements comprising, in weight percent, up to, 0.3 Mn, 1.5 Fe, and 0.15 Si; and
a balance of Ni, c) a heat resisting material consisting of:
a plurality of main alloying elements comprising, in weight percent, C from 0.02 to 0.06, Cr from 23.0 to 26.0, Co from 19.0 to 21.0, Ti from 1.1 to 1.9, Al from 0.9 to 1.5, and Nb from 1.0 to 1.6;
a plurality of residual elements comprising, in weight percent, up to, 1.5 Fe, 0.6 Mo, 0.5 Si, 0.4 Mn; and
a balance of Ni; and d) a heat resisting material consisting of:
a plurality of main alloying elements comprising, in weight, percent, Cr from 14.0 to 15.7, Mo from 4.5 to 5.5, Co from 18.0 to 22.0, Al from 4.5 to 4.9, Ti from 0.9 to 1.5, and B from 0.003 to 0.010;
a plurality of residual elements comprising, in weight percent, up to, 0.12 C, 1.0 Fe, 1.0 Mn, 1.0 Si, 0.0050 S, 0.2 Cu, and 0.15 Zr; and
a balance of Ni, and wherein the lock (17) is made of one of the group consisting of:

aa) a heat resisting material consisting of:
a plurality of main alloying elements comprising, in weight percent, C from 0.01 to 0.03, Cr from 20.0 to 23.0, Mo from 8.0 to 10.0, Nb from 3.20 to 3.80, Ti from 0.1 to 0.30, Al from 0.10 to 0.30, Mn from 0.10 to 0.50, and Si from 0.05 to 0.30;
a plurality of residual elements comprising, in weight percent, up to, 4.0 Fe, 1.0 Co, 0.015 P, and 0.015 S; and
a balance of Ni, bb) a heat resisting material consisting of:
a plurality of main alloying elements comprising, in weight percent, C from 0.04 to 0.08, Cr from 18.5 to 20.5, Mo from 8.0 to 9.0, Co from 9.0 to 11.0, Ti from 1.9 to 2.3, and B 0.003 to 0.005;
a plurality of residual elements comprising, in weight percent, up to, 0.3 Mn, 1.5 Fe, and 0.15 Si; and
a balance of Ni, cc) a heat resisting material consisting of:
a plurality of main alloying elements comprising, in weight percent, C from 0.02 to 0.06, Cr from 23.0 to 26.0, Co from 19.0 to 21.0, Ti from 1.1 to 1.9 Al from 0.9 to 1.5, and Nb from 1.0 to 1.6;
a plurality of residual elements comprising, in weight percent, up to 1.5 Fe, 0.6 Mo, 0.5 Si, 0.4 Mn; and
a balance of Ni, dd) a heat resisting material consisting of:
a plurality of main alloying elements comprising, in weight percent, C from 0.01 to 0.03, Cr from 20.0 to 23.0, Mo from 8.0 to 10.0, and Nb from 3.15 to 4.15;
a plurality of residual elements comprising, in weight percent, up to, 5.0 Fe, Ti 0.40 Ti, 0.40 Al, 0.1 Mn, 0.10 Si, 0.010 P, 0.005 S, 0.1 Cu, and 0.1 Co; and
a balance of Ni, ee) a heat resisting material consisting of:
a plurality of main alloying elements comprising, in weight percent, C from 0.05 to 0.1, Cr from 20.0 to 23.0, Mo from 8.5 to 10.0, Co from 11.0 to 14.0, Ti from 0.2 to 0.6, and Al from 0.7 to 1.4;
a plurality of residual elements comprising, in weight percent, up to, 2.0 Fe, 0.2 Mn, 0.2 Si, 0.010 P, 0.010 S, 0.5 Cu, and 0.006 B; and
a balance of Ni, ff) a heat resisting material consisting of:
a plurality of main alloying elements comprising, in weight percent, C from 0.05 to 0.1, Cr from 21.5 to 23.0, Mo from 8.5 to 10.0, Co from 11.5 to 13.0, Ti from 0.4 to 0.6, Al from 1.0 to 1.30, and B from 0.003 to 0.006;
a plurality of residual elements comprising, in weight percent, up to, 2.0 Fe, 0.1 Mn, 0.1 Si, 0.010 P, 0.050 S, 0.5 Cu; and
a balance of Ni; and gg) a heat resisting material consisting of:
a plurality of main alloying elements comprising, in weight percent, C from 0.04 to 0.08, Cr from 19.0 to 21.0, Mo from 5.6 to 6.1, Co from 19.0 to 21.0, Ti from 1.9 to 2.4, and a combination of Ti and Al from 2.4 to 2.8;
a plurality of residual elements comprising, in weight percent, up to, 0.7 Fe, 0.6 Mn, 0.40 Si, 0.60 Al, 0.007 S, 0.0020 Pb, 0.20 Cu, 0.0001 Bi, 0.005 B and
a balance of Ni, and wherein the strainer (25) is made of one of the group consisting of:

A) a heat resisting material consisting of:
   a plurality of main alloying elements comprising, in weight percent, C from 0.01 to 0.03, Cr from 20.0 to 23.0, Mo from 8.0 to 10.0, Nb from 3.20 to 3.80, Ti from 0.1 to 0.30, Al from 0.10 to 0.30, Mn from 0.10 to 0.50, and Si from 0.05 to 0.30;
   a plurality of residual elements comprising, in weight percent, up to, 4.0 Fe, 1.0 Co, 0.015 P, and 0.015 S; and
   a balance of Ni, B) a heat resisting material consisting of:
   a plurality of main alloying elements comprising, in weight percent, C from 0.04 to 0.08, Cr from 18.5 to 20.5, Mo from 8.0 to 9.0, Co from 9.0 to 11.0, Ti from 1.9 to 2.3, and B 0.003 to 0.005;
   a plurality of residual elements comprising, in weight percent, up to, 0.3 Mn, 1.5 Fe, and 0.15 Si; and
   a balance of Ni, C) a heat resisting material consisting of:
   a plurality of main alloying elements comprising, in weight percent, C from 0.02 to 0.06, Cr from 23.0 to 26.0, Co from 19.0 to 21.0, Ti from 1.1 to 1.9, Al from 0.9 to 1.5, and Nb from 1.0 to 1.6;
   a plurality of residual elements comprising, in weight percent, up to, 1.5 Fe, 0.6 Mo, 0.5 Si, 0.4 Mn; and
   a balance of Ni, D) a heat resisting material consisting of:
   a plurality of main alloying elements comprising, in weight percent, C from 0.01 to 0.03, Cr from 20.0 to 23.0, Mo from 8.0 to 10.0, and Nb from 3.15 to 4.15;
   a plurality of residual elements comprising, in weight percent, up to, 5.0 Fe, 0.40 Ti, 0.40 Al, 0.1 Mn, 0.10 Si, 0.010 P, 0.005 S, 0.1 Cu, and 0.1 Co; and
   a balance of Ni, E) a heat resisting material consisting of:
   a plurality of main alloying elements comprising, in weight percent, C from 0.05 to 0.1, Cr from 20.0 to 23.0, Mo from 8.5 to 10.0, Co from 11.0 to 14.0, Ti from 0.2 to 0.6, and Al from 0.7 to 1.4;
   a plurality of residual elements comprising, in weight percent, up to, 2.0 Fe, 0.2 Mn, 0.2 Si, 0.010 P, 0.010 S, 0.5 Cu, and 0.006 B; and
   a balance of Ni; and F) a heat resisting material consisting of:
   a plurality of main alloying elements comprising, in weight percent 0.05 to 0.1 C, 21.5 to 23.0 Cr, 8.5 to 10.0 Mo, 11.5 to 13.0 Co, 0.4 to 0.6 Ti, 1.0 to 1.30 Al, and 0.003 to 0.006 B;
   a plurality of residual elements comprising, in weight percent, up to, 2.0 Fe, 0.1 Mn, 0.1 Si, 0.010 P, 0.050 S, 0.5 Cu; and
   a balance of Ni.

2. The steam valve (5) of claim 1 further comprising a plurality of bolts (30) at a downstream end of the valve (5) for fixing the location of the valve (5), the plurality of the bolts (30) are made of one of the group consisting of v) a heat resisting material consisting of:
   a plurality of main alloying elements comprising, in weight percent, C from 0.03 to 0.07, Cr from 23.8 to 24.8, Mo from 1.2 to 1.7, Co from 19.0 to 20.5, Ti from 2.8 to 3.2, Al from 1.2 to 1.6, Nb from 0.7 to 1.2, Zr from 0.03 to 0.07, B from 0.01 to 0.015;
   a plurality of residual elements comprising, in weight percent, up to, 1.0 Fe, 0.5 Mn, 0.5 Si, 0.0050 P, 0.0050 S, 0.2 Cu, 0.006 Mg, 0.05 Ta; and
   a balance of Ni, w) a heat resisting material consisting of:
   a plurality of main alloying elements comprising, in weight percent Cr from 14.0 to 15.7, Mo from 4.5 to 5.5, Co from 18.0 to 22.0, Al from 4.5 to 4.9, Ti from 0.9 to 1.5, and B from 0.003 to 0.010;
   a plurality of residual elements comprising, in weight percent, up to, 0.12 C, 1.0 Fe, 1.0 Mn, 1.0 Si, 0.0050 S, 0.2 Cu, and 0.15 Zr; and
   a balance of Ni, x) a heat resisting material consisting of:
   a plurality of main alloying elements comprising, in weight percent, C from 0.04 to 0.08, Cr from 18.5 to 20.5, Mo from 8.0 to 9.0, Co from 9.0 to 11.0, Ti from 1.9 to 2.3, and B 0.003 to 0.005;
   a plurality of residual elements comprising, in weight percent, up to, 0.3 Mn, 1.5 Fe, and 0.15 Si; and
   a balance of Ni, y) a heat resisting material consisting of:
   a plurality of main alloying elements comprising, in weight percent, C from 0.02 to 0.06, Cr from 23.0 to 26.0, Co from 19.0 to 21.0, Ti from 1.1 to 1.9, Al from 0.9 to 1.5, and Nb from 1.0 to 1.6;
   a plurality of residual elements comprising, in weight percent, up to, 1.5 Fe, 0.6 Mo, 0.5 Si, 0.4 Mn; and
   a balance of Ni; and z) a heat resisting material consisting of:
   a plurality of main alloying elements comprising, in weight percent Co from 12.0 to 15.0, Cr from 8.0 to 21.0, Mo from 3.50 to 5.00, Al from 1.2 to 1.6, Ti from 2.8 to 3.3, B from 0.0030 to 0.0100, Zr from 0.02 to 0.08, C from 0.02 to 0.1, and Mn from 0.02 to 0.1;
   a plurality of residual elements comprising, in weight percent, up to, 0.15 Si, 0.015 P, 0.015 S, 2.0 Fe, and 0.10 Cu; and
   a balance of Ni.

* * * * *